(12) United States Patent
Dent et al.

(10) Patent No.: US 7,471,451 B2
(45) Date of Patent: Dec. 30, 2008

(54) MULTIPLE FIELD OF VIEW OPTICAL SYSTEM

(75) Inventors: Gregory D. Dent, Hillsboro, OR (US); Kevin E. Jones, Portland, OR (US); William H. Taylor, South Deerfield, MA (US); James H. Weaver, West Linn, OR (US); John M. Wiltse, Lake Oswego, OR (US)

(73) Assignee: FLIR Systems, Inc., Wilsonville, OR (US)

(*) Notice: Subject to any disclaimer, the term of this patent is extended or adjusted under 35 U.S.C. 154(b) by 0 days.

(21) Appl. No.: 11/250,362

(22) Filed: Oct. 14, 2005

(65) Prior Publication Data

US 2007/0086087 A1 Apr. 19, 2007

(51) Int. Cl.
*G02B 23/00* (2006.01)
(52) U.S. Cl. ........................................ 359/421
(58) Field of Classification Search ............... 359/419, 359/421
See application file for complete search history.

(56) References Cited

U.S. PATENT DOCUMENTS

| | | | |
|---|---|---|---|
| 1,236,722 A | 8/1917 | Lange | |
| 1,812,833 A | 6/1931 | Schaefer | |
| 2,552,940 A | 5/1951 | Cornut | |
| 2,945,414 A | 7/1960 | Blackstone | |
| 3,085,354 A | 4/1963 | Rasmussen et al. | |
| 3,128,982 A | 4/1964 | Christopher | |
| 3,638,502 A | 2/1972 | Leavitt et al. | |
| 3,765,631 A | 10/1973 | Herbst et al. | |
| 4,044,364 A | 8/1977 | Prinzo | |
| 4,155,521 A | 5/1979 | Evans et al. | |
| 4,195,903 A | 4/1980 | Kawase et al. | |
| 4,218,702 A | 8/1980 | Brocard et al. | |
| 4,961,636 A * | 10/1990 | Gaul et al. | 359/381 |
| 4,989,466 A | 2/1991 | Goodman | |
| 5,034,759 A | 7/1991 | Watson | |
| 5,077,465 A | 12/1991 | Wagner et al. | |
| 5,121,220 A * | 6/1992 | Nakamoto | 359/419 |
| 5,279,479 A | 1/1994 | Adama et al. | |
| 5,372,333 A | 12/1994 | Uwira et al. | |
| 5,383,645 A | 1/1995 | Pedut et al. | |
| 5,515,206 A | 5/1996 | Peng | |
| 5,527,003 A | 6/1996 | Diesel et al. | |
| 5,528,416 A | 6/1996 | Hartmann | |
| 5,691,842 A * | 11/1997 | Devenyi et al. | 359/432 |
| 5,726,814 A | 3/1998 | Lidwell | |
| 5,831,762 A | 11/1998 | Baker et al. | |
| 5,897,223 A | 4/1999 | Tritchew et al. | |
| 5,907,433 A * | 5/1999 | Voigt et al. | 359/432 |
| 5,954,310 A | 9/1999 | Soldo et al. | |
| 5,967,458 A | 10/1999 | Williams et al. | |
| 6,145,393 A | 11/2000 | Canton | |
| 6,154,317 A | 11/2000 | Segerstrom et al. | |
| 6,175,807 B1 | 1/2001 | Buchler et al. | |
| 6,181,988 B1 | 1/2001 | Schneider et al. | |

(Continued)

*Primary Examiner*—Arnel C Lavarias
*Assistant Examiner*—Mark Consilvio
(74) *Attorney, Agent, or Firm*—Kolisch Hartwell, PC

(57) ABSTRACT

Optical systems, including apparatus and methods, for obtaining images, particularly with multiple fields of view. These systems may utilize a plurality of optical components with different optical axes, where the optical axes may be selectively rotated into alignment with an imaging axis to obtain images having various discrete fields of view.

22 Claims, 7 Drawing Sheets

U.S. PATENT DOCUMENTS

| | | |
|---|---|---|
| 6,271,975 B1 * | 8/2001 | Grupp ........................ 359/721 |
| 6,354,749 B1 | 3/2002 | Pfaffenberger |
| 6,396,235 B1 | 5/2002 | Ellington et al. |
| 6,422,508 B1 | 7/2002 | Barnes |
| 6,454,229 B1 | 9/2002 | Voigt et al. |
| 6,708,943 B2 | 3/2004 | Ursan et al. |
| 6,764,051 B2 | 7/2004 | Knight |
| 7,023,615 B1 * | 4/2006 | Voigt et al. .................. 359/399 |
| 7,264,220 B2 | 9/2007 | Dent et al. |
| 2006/0071121 A1 | 4/2006 | Wescott et al. |
| 2007/0194170 A1 | 8/2007 | Ellison et al. |

* cited by examiner

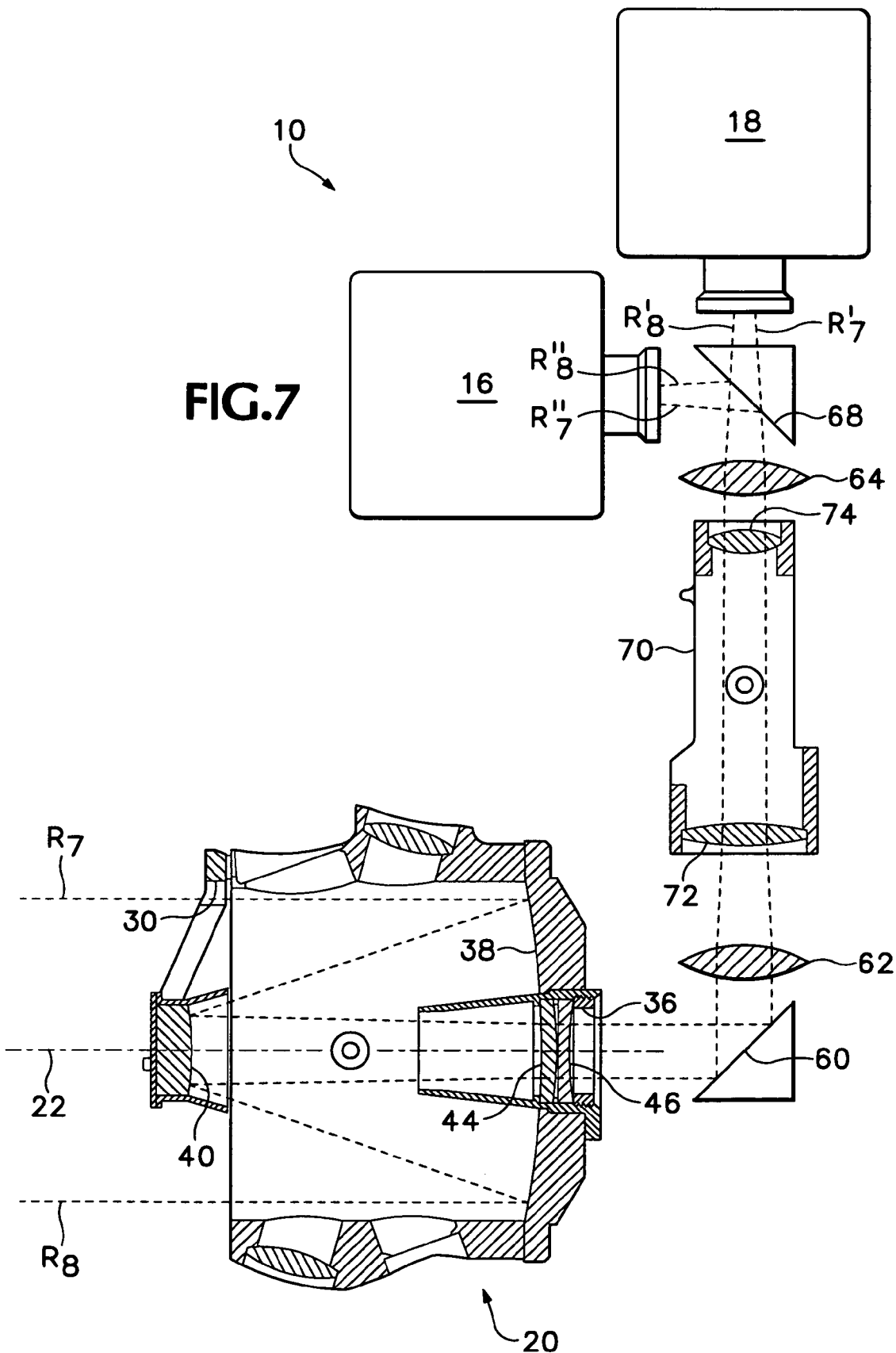

MULTIPLE FIELD OF VIEW OPTICAL SYSTEM

INTRODUCTION

Optical systems may be used to form and/or record images of objects and/or scenes. These systems often operate with variable magnification, providing multiple fields of view. This allows the systems to obtain image data that may vary, continuously or discretely, between a high-magnification, narrow field of view, and a low-magnification wide field of view.

One way to obtain variable magnification is to move one or more optical components—e.g., lenses and/or mirrors—along an imaging axis to change the field of view. For example, zoom lens systems typically operate by maintaining fixed positions of objective and eyepiece lenses, and moving an intermediate lens along the imaging axis of the system to achieve a desired zoom.

Unfortunately, zoom lens systems suffer from a number of drawbacks. First, the motions of intermediate lenses in an optical system may change the center of gravity of the system, which may be undesirable for many applications. Second, systems designed to allow substantial amounts of zoom have a minimum length, which may in some cases fall outside the desired design parameters of the instrument. Third, moving an intermediate lens along an imaging axis requires precision to maintain alignment of the lens, and this motion therefore may take an undesirably long time to perform accurately.

For these and/or other reasons, optical systems have been designed that use rotary mechanisms to rotate different optical components into line with the imaging axis of the system, providing the system with discrete multiple fields of view. This approach commonly is used in military and surveillance systems. Compared to zoom lenses, lenses with discrete fields of view may allow faster changes of the field of view with better alignment between fields of view. A multiple field of view system can quickly zoom in on a target for detail, or zoom out for context. Infrared or thermal imaging systems also commonly use multiple field of view systems for the reasons listed above, but additionally because image artifacts particular to infrared systems (especially the narcissus effect, a phenomenon where the imaging system sees the reflection of its own cryogenically cooled detector from a highly reflective surface) are easier to control in multiple field of view lenses than in zoom lenses.

Unfortunately, existing discrete multiple field of view optical systems, like zoom lens systems, suffer from a number of drawbacks. First, many such systems are primarily refractive rather than reflective, and these systems are less compact and have more chromatic aberrations than reflective optical systems. Good chromatic correction makes an optical system well-suited for multi-spectral applications, including collection of visible image data combined with near infrared, short-wave infrared, or even mid-wave infrared image data (or, alternatively, or in addition, ultraviolet image data). Second, other systems employ optical components that can be selectively moved in and out of alignment with the imaging axis, but these are difficult to align and may occupy an undesirable amount of space. Third, while still other systems are designed to rotate optical components in and out of alignment with an imaging axis (e.g., U.S. Pat. No. 5,726,814 to Lidwell), these systems may be constrained to highly specific arrangements of optical components, such as on the various faces of a cube or other regular polyhedron, each of which requires a particular—and possibly inconvenient—choice of rotation axis.

Thus, in summary, a need exists for a compact, discrete, multiple field of view optical system having a flexible geometry and allowing a convenient choice of rotation axis.

SUMMARY

The present teachings provide optical systems, including apparatus and methods, for obtaining images, particularly with multiple fields of view. These systems may utilize a plurality of optical components with different optical axes, where the optical axes may be selectively rotated into alignment with an imaging axis to obtain images having various discrete fields of view.

BRIEF DESCRIPTION OF THE DRAWINGS

FIG. 7 is yet another partially schematic sectional view of the optical system of FIG. 1, showing the system configured to collect super narrow field of view (SNFOV) image data.

DEFINITIONS

Figure 1:
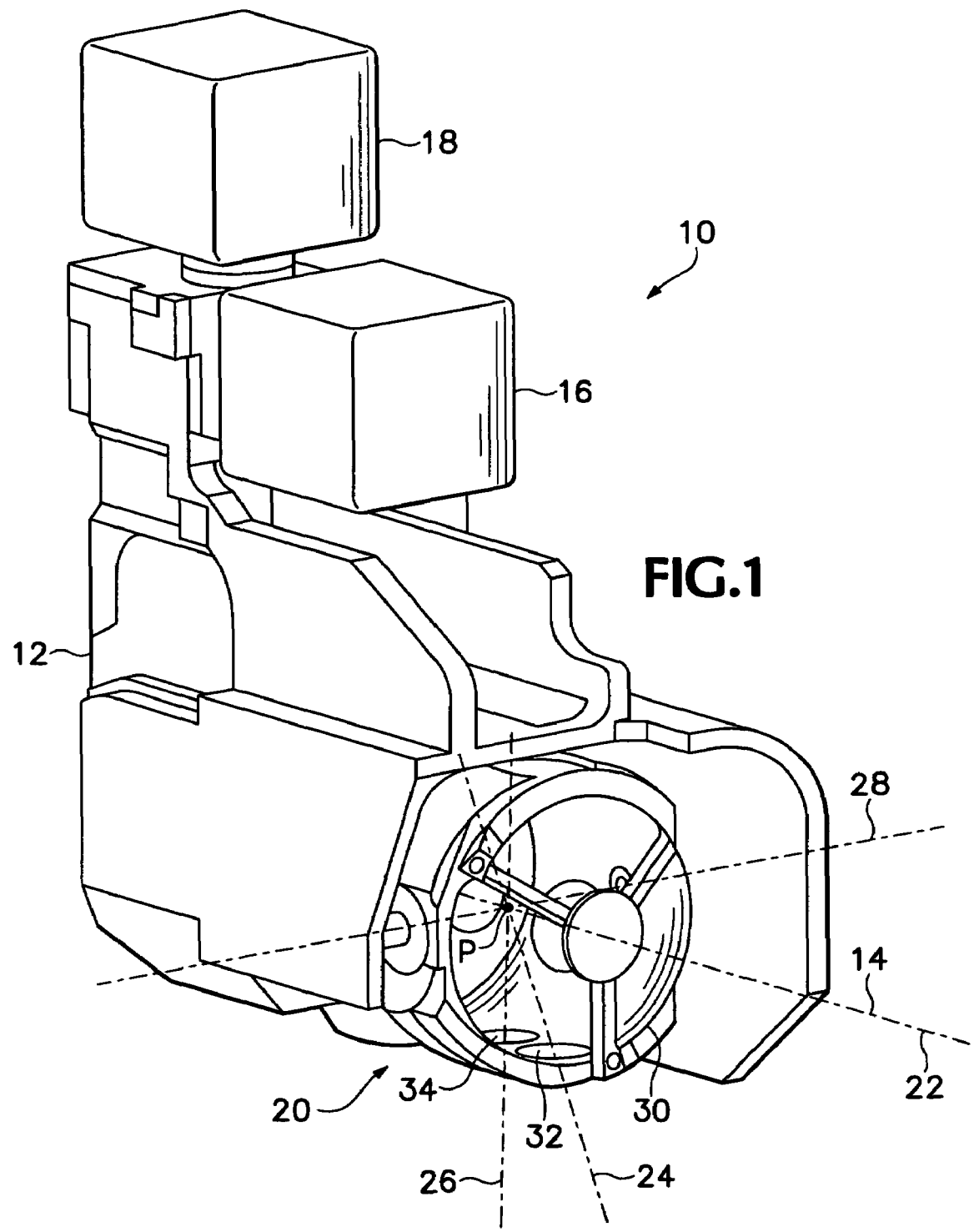
FIG. 1 is an axonometric view of an exemplary optical system, including a multiple field of view optical instrument, in accordance with aspects of the present teachings.

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet radiation. Invisible electromagnetic radiation having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light. Visible electromagnetic radiation having wavelengths from about 360 or 400 nanometers, just longer than ultraviolet radiation, to about 760 or 800 nanometers, just shorter than infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation. Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared having wavelengths between about 3,000 and 5,000 nm (i.e., 3 and 5 µm) and between about 7,000 or 8,000 and 14,000 nm (i.e., 7 or 8 and 14 µm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm), (B) short-wave infrared (SWIR) (from about 1,000 nm to about 3,000 nm), (C) mid-wave infrared (MWIR) (from about 3,000 nm to about 6,000 nm), (D) long-wave infrared (LWIR) (from about 6,000 nm to about 15,000 nm), and (E) very long-wave infrared (VLWIR) (from about 15,000 nm to about 1 mm). Portions of the infrared, particularly portions in the far or thermal IR having wavelengths between about 0.1 and 1 mm, may alternatively, or in addition, be termed millimeter-wave (MMV) wavelengths.

DETAILED DESCRIPTION

The present teachings provide optical systems, including apparatus and methods, for obtaining images, particularly with multiple fields of view. These systems may utilize a plurality of optical components with different optical axes, where the optical axes may be selectively rotated into alignment with an imaging axis to obtain images having various discrete fields of view. These fields of view may include minifying and/or magnifying fields, among others, and be viewed at the same and/or different wavelengths, such as ultraviolet, visible, infrared, and/or millimeter-wave (MMW) wavelengths, among others. The systems may include reflective and/or refractive elements, such as reflective and/or refractive telescopes, among others. Thus, in some embodiments, the systems may be capable of rotating or otherwise moving reflective and/or refractive elements in and out of the optical axis, facilitating imaging of both visible and infrared light, among others. The systems, in turn, may be supported by any suitable platform(s), such as ground vehicles, aircraft (including piloted and pilotless helicopters, airplanes, drones, missiles, etc.), and/or spacecraft (including orbiting satellites), among others. The systems may be used for any suitable purpose(s), including navigation, targeting, search and rescue, law enforcement, and/or surveillance, among others.

FIG. 1 depicts an exemplary optical system 10, in accordance with aspects of the present teachings. The system may include a housing 12, defining an imaging axis 14 along which image data are received from an external source. The image data may be received from any suitable field of view, including a narrow field of view (NFOV), medium field of view (MFOV), wide field of view (WFOV), and/or super narrow field of view (SNFOV), among others. The received image data may be processed in any suitable fashion, including, for example, through magnification, minification, elimination of stray light, filtering, beam splitting, and/or capturing with one or more cameras 16, 18 or other imaging devices, as described below in more detail.

System 10 includes an optical instrument 20, mounted within housing 12, and configured to receive image data and to provide multiple discrete fields of view. Instrument 20 defines a plurality of optical axes, such as a NFOV axis 22, a MFOV axis 24, and/or a WFOV axis 26, among others, as depicted in FIG. 1. Here, optical axes 22, 24, 26 intersect at a point P, and define a common plane within which imaging axis 14 is configured substantially to lie when instrument 20 is mounted within housing 12. Axes 22, 24, 26 may be chosen to lie at any suitable angles with respect to each other. For example, as depicted in FIG. 1, MFOV axis 24 may form an angle of approximately 70 degrees with respect to NFOV axis 22, and WFOV axis 26 may form an angle of approximately 105 degrees with respect to NFOV axis 22. More generally, the system may include optics for viewing any suitable or desired number of fields of view, with axes offset from (or overlapping with) one another by any suitable or desired angles.

The optical instrument includes a rotation axis 28 that is defined substantially perpendicular to the common plane of optical axes 22, 24, 26. Rotation axis 28 may be configured to pass through point P, such that rotation of instrument 20 about axis 28 may lead to selective alignment of any of the optical axes 22, 24, 26 with imaging axis 14. Thus, by rotating the instrument, the instrument may be aligned so that image data will travel along any desired optical axis, and any of the provided fields of view may be obtained. Furthermore, instrument 20 may be designed such that point P coincides with the center of mass of the instrument, so that rotation of the instrument about axis 28 does not require motion of the center of mass, and does not unbalance the instrument. In some embodiments, the optical axes corresponding to the various fields of view may not intersect at a single point or lie in a common plane, in which case more general rotations of instrument 20 may be necessary to align the various optical axes with the imaging axis of system 10.

In contrast to traditional zoom lens systems and other multiple field of view systems, the optical elements (e.g., mirrors and/or lenses) within instrument 20 typically are disposed in fixed relation to each other. Therefore, rotation of the instrument may be accomplished with relatively lower precision than that required for positioning the optical elements in those other systems, potentially resulting in a better performing, more reliable system at a lower cost. Bearing surfaces (not shown), such as cylindrical bearings, cones, or bearing races, among others, may be provided for rotating instrument 20 about its rotation axis with minimal friction. Rotation may be accomplished automatically using any suitable motor-driven mechanism, or in some embodiments, such as hand-held or other highly portable embodiments, rotation of instrument 20 may be accomplished manually. A pivot assembly, including bearing surfaces and gears or other linkages to a motor, may be provided and attached to or incorporated within instrument 20 to facilitate its rotation.

FIG. 1 shows the optical system with NFOV axis 22 aligned with imaging axis 14. However, in other configurations, axis 24 or 26 may be aligned with the imaging axis, for example, by rotating instrument 20 about rotation axis 28 to a desired degree. In the configuration shown in FIG. 1, image data are received through a primary NFOV aperture (or opening) 30. However, upon rotation of the instrument about its rotation axis, the instrument can be aligned selectively so that image data may be received through a primary MFOV aperture (or opening) 32, in which case MFOV axis 24 will be aligned with imaging axis 22, or through a primary WFOV aperture (or opening) 34, in which case WFOV axis 26 will be aligned with imaging axis 22. If other optical axes are provided corresponding to other fields of view, these axes similarly may be aligned with the imaging axis to obtain images in these alternate fields of view.

Figure 2:
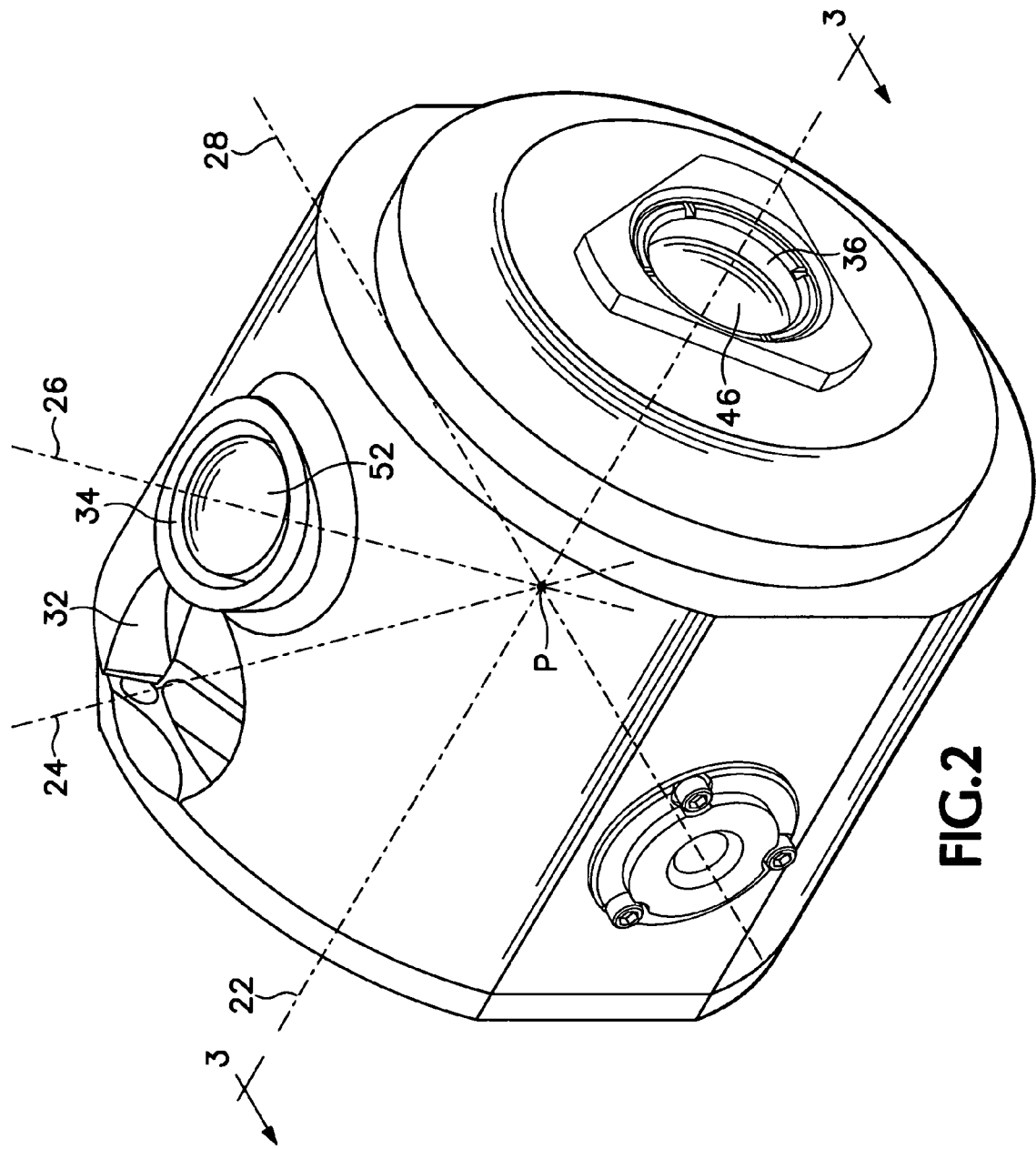
FIG. 2 is an axonometric view of the optical instrument of FIG. 1, rotated by 180 degrees, without change in elevation, from the view in FIG. 1, with the instrument shown detached from its housing.

FIG. 2 shows an alternative view of optical instrument 20, from a perspective generally rotated by 180 degrees, without change in elevation, from the perspective shown in FIG. 1. This view shows secondary apertures (or openings), positioned generally opposite the primary apertures shown in FIG. 1, for passage and further processing of inputted light. For example, a secondary NFOV aperture 36 of the instrument is disposed along NFOV optical axis 22 and opposite primary NFOV aperture 30, so that NFOV image data may be received, magnified, and then passed through secondary aperture 36 for further processing and/or collection, for example, as described below. Similarly, secondary MFOV and secondary WFOV apertures (not shown in FIG. 2) are provided to allow MFOV and WFOV image data to pass through the optical instrument along the imaging axis. Image data passing through any of these apertures may be reflected from one or more mirrors and/or be refracted through one or more lenses, for example, as described below.

Figure 3:
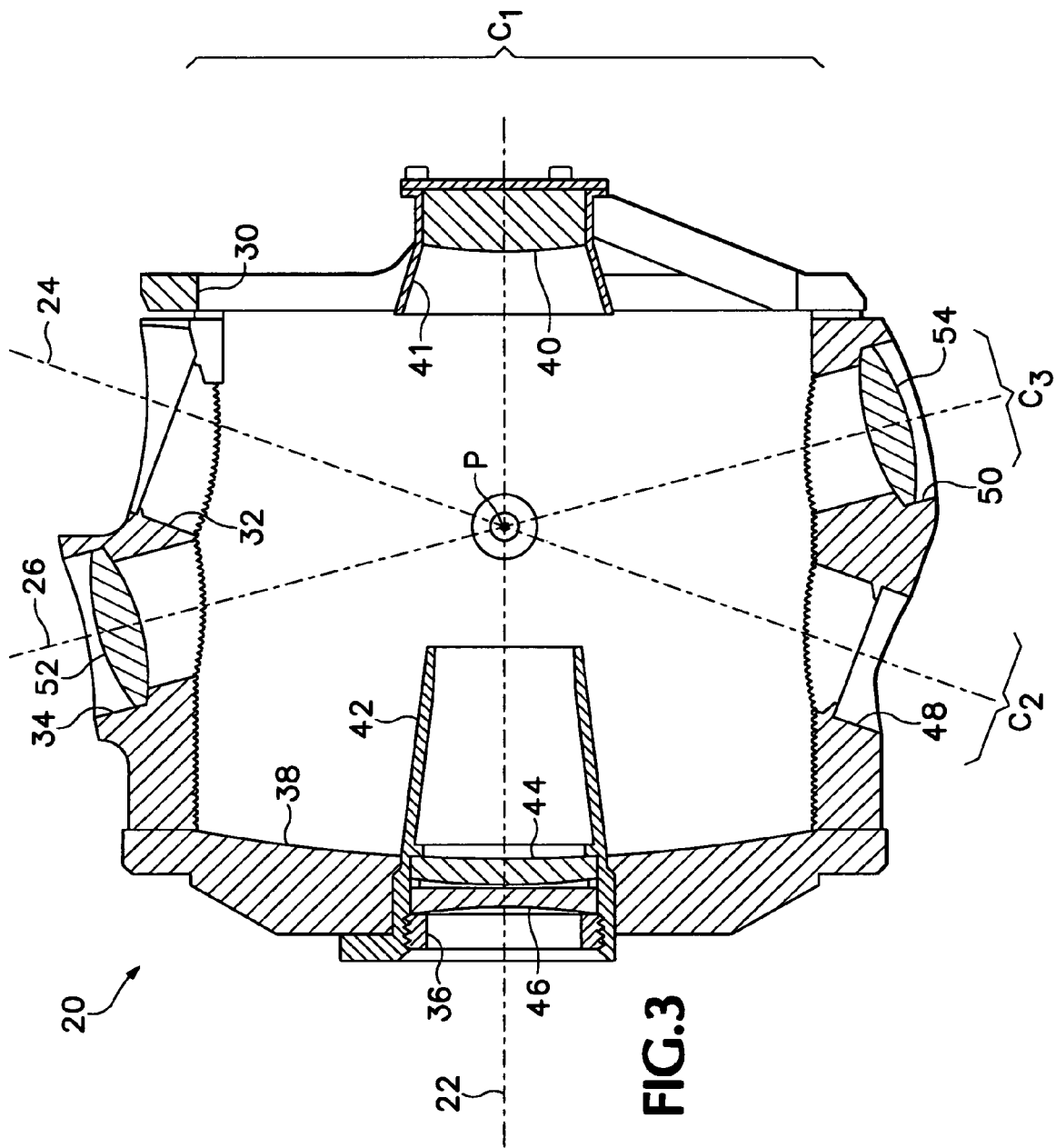
FIG. 3 is a sectional view of the optical instrument of FIG. 2, taken generally along line 3-3 in FIG. 2.

FIG. 3 shows a sectional view of optical instrument 20, taken generally along line 3-3 of FIG. 2. This view emphasizes the relationship between the NFOV (22), MFOV (24), and WFOV (26) optical axes, which, in this embodiment, are at least generally coplanar, with a common rotation axis.

The NFOV system, as discussed above, is used for relatively high magnification, relatively narrow field of view imaging. When NFOV optical axis 22 is aligned with the imaging axis, image data pass through NFOV aperture 30, and reflect from primary mirror 38 towards secondary mirror 40. The primary and secondary mirrors may have any suitable geometries and orientations for receiving and focusing incoming image data. Typically, and as depicted in FIG. 3, primary mirror 38 is parabolic, with a circular aperture 36, and secondary mirror 40 is hyperbolic.

The image data (in this and/or other configurations) may pass through one or more baffles. For example, a baffle 41, also known as a secondary baffle, may be provided to prevent stray light from reaching the secondary mirror. Secondary baffle 41 may be configured to subtend an angle approximately equal to the angle subtended by the primary mirror, so that the secondary mirror will receive light substantially only from the primary mirror. After passing through secondary baffle 41, image data reflect from secondary mirror 40, and then pass through a primary baffle 42. Primary baffle 42 may help to prevent stray light from reaching aperture 36, and may be configured to subtend an angle approximately equal to the angle subtended by secondary mirror 40 for this purpose. The WFOV and MFOV rays may be directed or squeezed between the primary and secondary baffles.

The image data pass, after passing through the primary baffle, through aperture 36. However, before the image data pass through the secondary aperture, the data may pass through one or more lenses, such as lenses 44, 46. These lenses, which also may be referred to as collimating lenses, may be configured to collimate the rays that exit instrument 20 through aperture 36, i.e., to produce parallel rays that do not focus. This has the advantage that focusing the final image may be accomplished by a portion of optical system 10 external to instrument 20, typically by imaging optics such as one or more objective lenses disposed in another portion of housing 12. If instrument 20 is afocal, this focusing may be accomplished independently of the details of any processing of the received image data by instrument 20, i.e., independently of the field of view. In addition, the positioning of instrument 20 with respect to the imaging optics is not critically precise, allowing for looser manufacturing tolerances and lower cost.

Mirrors 38 and 40 may act together, as described above, as a first optical component $C_1$, which may be described as a cassegrain-type reflecting telescope providing a narrow field of view. In conjunction with lenses 44, 46, component $C_1$ may be described as an afocal reflecting telescope. Using a reflecting telescope to produce NFOV images may reduce undesirable chromatic aberration that typically results from obtaining magnified images with a refracting telescope. Reflecting telescope $C_1$ may utilize a primary mirror of any chosen diameter, to provide any desired light-gathering ability and magnification, the latter of which also is determined partially by the focal length of the objective lens used to produce the final image. In the depicted embodiment, telescope $C_1$ is configured to provide a magnification of 5.25×.

The MFOV system, as discussed above, is used for medium (or intermediate) magnification. When MFOV optical axis 24 is aligned with imaging axis 20, received image data pass through primary MFOV aperture 32, travel along axis 24, and then pass through secondary MFOV aperture 48. Primary and secondary MFOV apertures 32, 48 thus may be thought of as operating together as a single optical component $C_2$, which provides a medium field of view. One or both of MFOV apertures 32, 48 may take the form of an aperture stop configured to limit the size of the MFOV image ray bundle passing through instrument 20. This controls "beam wander" when the system is in the medium field of view, and may reduce various undesirable imaging effects, such as image vignetting or illumination falloff, that can result from collecting image data through a larger aperture.

MFOV apertures 32, 48 are depicted in FIG. 3 as pure aperture stops, without any associated lenses or mirrors. However, in general such lenses or mirrors may be disposed within the MFOV apertures to produce any desired magnification or minification of MFOV image data, in which case the width of the apertures still may serve as aperture stops to limit undesirable image vignetting. In other words, optical component $C_2$ may function solely as a MFOV aperture stop, and/or it may function as a telescope or a reverse telescope, in which case the telescope may be a refracting telescope, or it may be another reflecting telescope similar in design to optical component $C_1$, but providing a different field of view than component $C_1$.

The WFOV system, as discussed above, is used for relatively low magnification, relatively wide field of view imaging. When WFOV axis 26 is aligned with imaging axis 20, received image data pass through primary WFOV aperture 34, travel along axis 26, and then pass through secondary WFOV aperture 50. As depicted in FIG. 3, a lens 52 may be disposed within aperture 34, and a lens 54 may be disposed within aperture 50. Lenses 52 and 54 each may be either converging or diverging lenses, and may be chosen to have any suitable radii of curvature to produce a desired imaging effect. Furthermore, in some embodiments, there may be multiple lenses, or no lenses at all, disposed within one or both of apertures 34 and 50. Regardless of the number and characteristics of lenses disposed within apertures 34 and 50, one of both of these apertures may be configured as an aperture stop which limits beam wander and vignetting of WFOV images in the manner described previously with respect to MFOV images. Together, apertures 34, 50 and the lenses disposed within them form a third optical component $C_3$ for providing a wide field of view, which in the depicted embodiment is an afocal reverse refracting telescope.

The reverse telescope $C_3$ depicted in FIG. 3 is configured to provide a minification of 6.2×, but in general the WFOV optical component of instrument 20 may be configured to provide any desired minification. Furthermore, although, in the depicted embodiment, component $C_3$ is a pure minifier with no power and cannot form an image by itself, other embodiments can use image-forming telescopes, for example, by leaving out secondary lenses 56, 58. However, as described previously, providing afocal optical components allows focusing of received image data to be accomplished independently of the field of view provided by instrument 20, which may be desirable in some embodiments.

FIGS. 4-7 show partially schematic sectional views of the optical system of FIG. 1. These views portray the optical system in different optical arrangements, including (1) an NFOV configuration, (2) an MFOV configuration, (3) a WFOV configuration, and (4) an SNFOV configuration. These arrangements are shown, without limitation, being used to visualize two signals, one primarily visible, and the other primarily infrared (or, in some embodiments, primarily near infrared). The arrangements may, more generally, be used in any suitable number, for any suitable number of signals, with any suitable wavelength(s).

Configuration 1: Narrow Field of View (NFOV)

Figure 4:
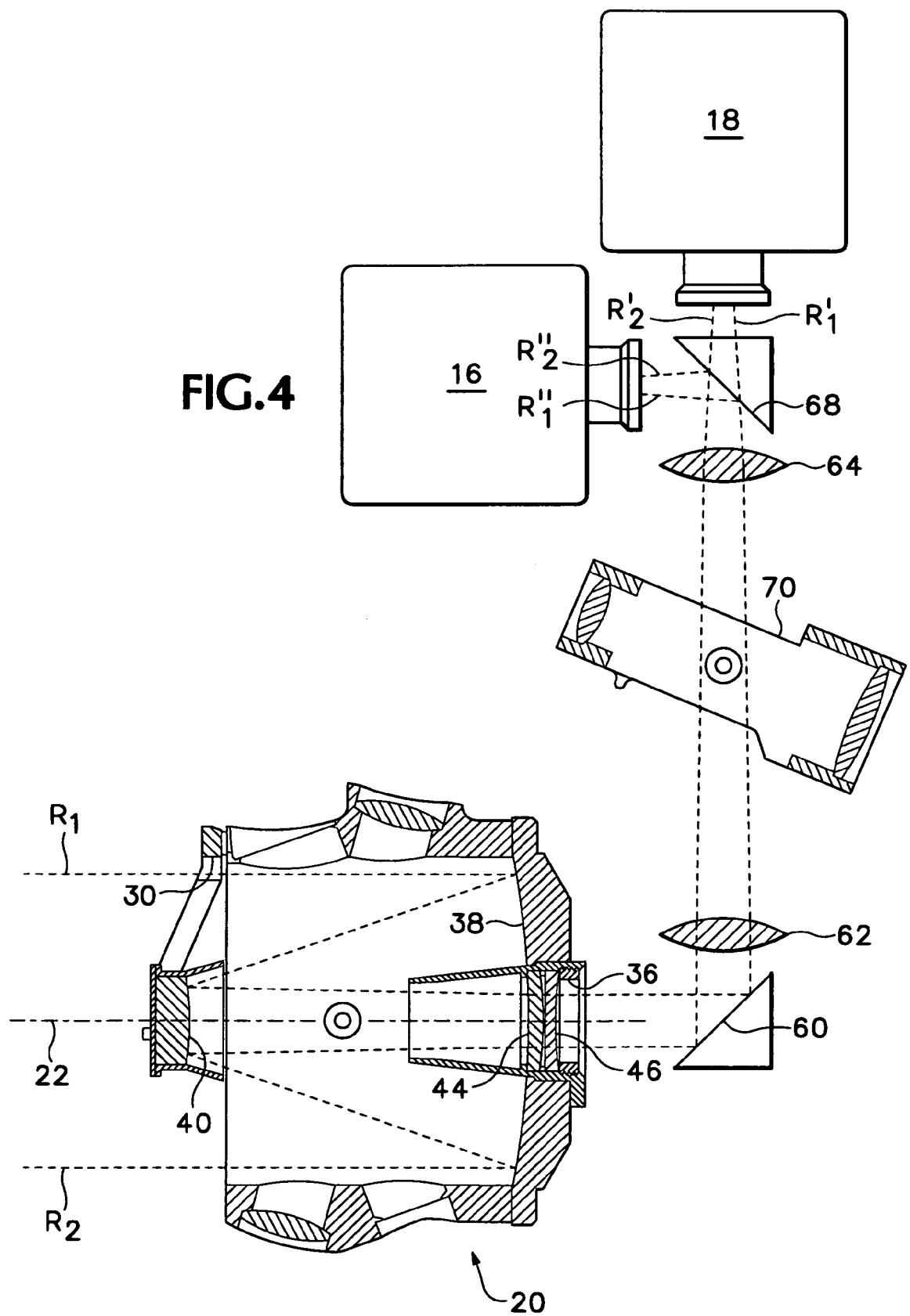
FIG. 4 is a partially schematic sectional view of the optical system of FIG. 1, showing the system configured to collect narrow field of view (NFOV) image data.

FIG. 4 is a partially schematic sectional view of system 10, showing instrument 20 in position to receive narrow field of view (NFOV) image data, in accordance with aspects of the present teachings. Here, NFOV optical axis 22 is aligned with the imaging axis of the system.

FIG. 4 shows the paths of representative parallel rays $R_1$, $R_2$ through the system. Rays $R_1$, $R_2$ enter instrument 20 through aperture 30, reflect from primary mirror 38 towards secondary mirror 40, reflect from secondary mirror 40 toward and then through lenses 44, 46 before exiting the instrument through aperture 36. Lenses 44, 46 may be collimating lenses configured to produce afocal ray bundles, as described previously and depicted here, so that rays $R_1$, $R_2$ may be parallel when they exit instrument 20 and may be focused by imaging optics provided in a portion of system 10 external to instrument 20.

After exiting instrument 20, rays $R_1$, $R_2$ travel towards an imaging system, which includes imaging devices, such as cameras 16, 18. In the depicted embodiment, the imaging system also includes a mirror 60 oriented at 45 degrees with respect to the rays and configured to redirect the rays towards the cameras. The rays then may pass through various optical elements configured to produce a focused image, such as lens elements 62 and 64 depicted in FIG. 4. These optical elements, which collectively may be referred to as the imaging optics of the system, each may be converging and/or diverging lenses, the net effect of which is to converge rays $R_1$, $R_2$ to a point within the focal plane of one or more imaging devices. Furthermore, in some embodiments, the imaging optics may include additional, or fewer, optical elements than those depicted. In embodiments where instrument 20 is configured to produce focused images, some or all of the imaging optics of the system may be disposed within instrument 20 rather than external to it.

After passing through the imaging optics, rays $R_1$, $R_2$ may arrive at a beamsplitter 68 configured to divide or split the arriving image signal. Beamsplitters, such as beamsplitter 68, generally comprise optical devices configured to separate electromagnetic radiation into different wavelength bands, for example, separating a visible light band from an infrared (or near infrared) radiation band. Suitable beamsplitters (such as dichroic or multi-dichroic beamsplitters) may operate by a variety of mechanisms, for example, by preferentially transmitting one wavelength band while preferentially reflecting another wavelength band, and/or by deflecting or diffracting one wavelength band to a different extent than another wavelength band. Suitable beamsplitters may include prismatic materials, such as fused silica or quartz, and may be coated with a metallic or dielectric layer having wavelength-dependent transmission and reflection properties. Alternatively, or in addition, suitable beamsplitters may include diffractive materials or devices, such as an acousto-optic modulator. In the present example, beamsplitter 68 is configured at least substantially to transmit visible light, and at least substantially to reflect infrared (or at least near infrared) light.

Thus, rays $R_1'$, $R_2'$, which represent a portion of the image data contained in rays $R_1$, $R_2$, pass through beamsplitter 68, and contain primarily or exclusively visible wavelengths. This portion of the signal arrives at imaging device 18, which in the depicted embodiment is a visible camera configured to capture and record visible wavelength images in any suitable manner, for example, with a charge-coupled device (CCD) chip or array. Rays $R_1''$, $R_2''$, on the other hand, which represent another portion of the image data contained in original rays $R_1$, $R_2$, are reflected by the beamsplitter, and contain primarily or exclusively the infrared portion of the image signal. These rays are redirected towards an infrared (or, in some embodiments, a near infrared) camera 16 configured to capture and record infrared (or, in some embodiments, near infrared) wavelength images, again, in any suitable manner.

Before arriving at either of imaging devices 16 or 18, the visible and/or infrared signal (represented by rays $R_1'$, $R_2'$, and/or $R_1''$, $R_2''$, respectively) may pass through one or more additional optical elements (not shown), such as a field flattener configured to correct field curvature and thus to focus the image signals more precisely at the focal planes of the imaging devices. The provided field flatteners may, for example, take the form of one or more lenses (each of which may be either converging or diverging) disposed near the respective entrances of devices 16, 18. In addition or instead of field flatteners, any other optical elements such as filters, baffles, aperture stops, or additional corrective lenses may be positioned along the imaging path of one or both of imaging devices 16 or 18.

Configuration 2: Medium Field of View (MFOV)

Figure 5:
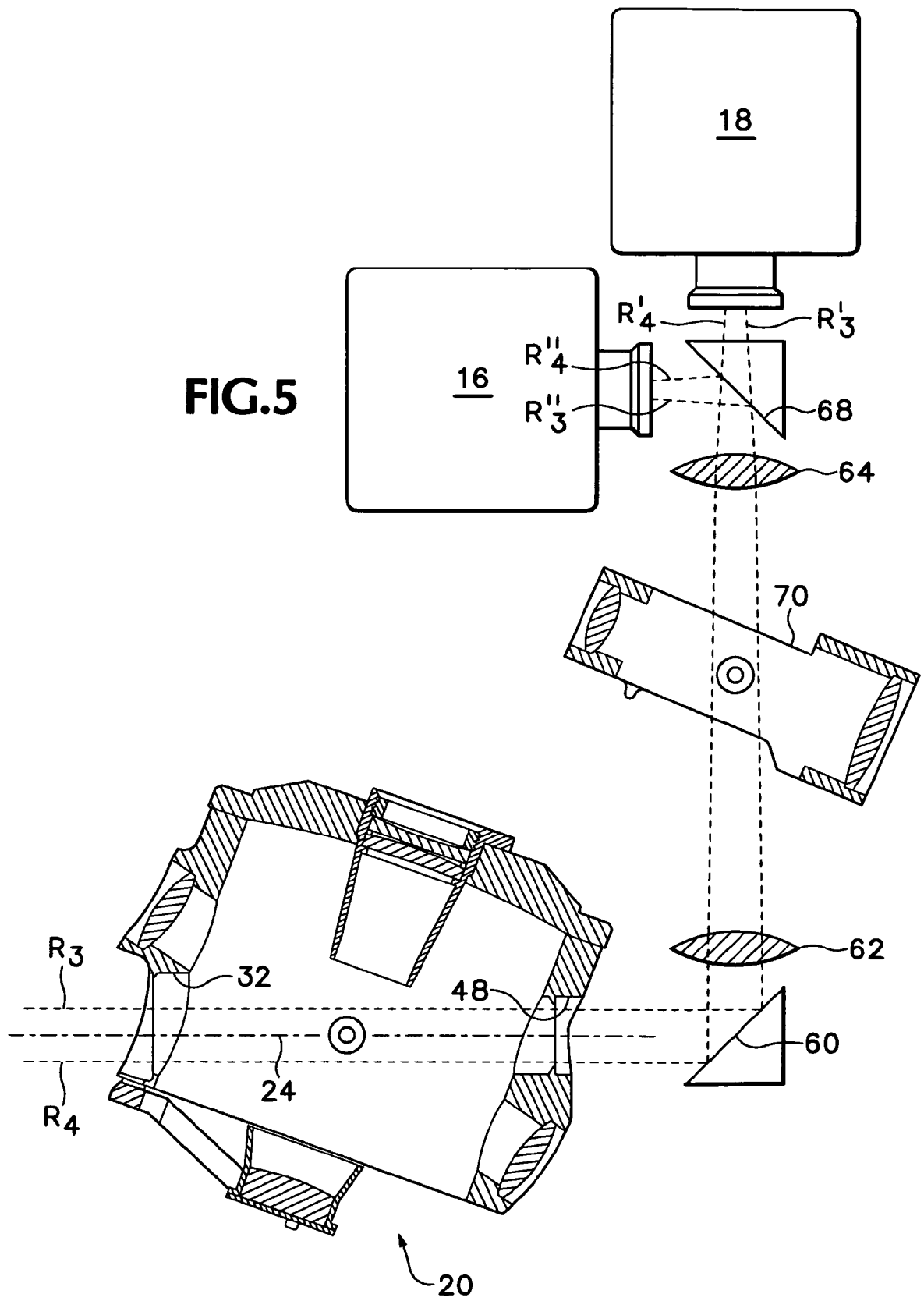
FIG. 5 is another partially schematic sectional view of the optical system of FIG. 1, showing the system configured to collect medium field of view (MFOV) image data.

FIG. 5 is another partially schematic sectional view of system 10, similar to FIG. 4, but showing instrument 20 in position to receive medium field of view (MFOV) image data, in accordance with aspects of the present teachings. Here, MFOV optical axis 24 is aligned with the imaging axis of the system.

The paths of two representative parallel rays, $R_3$, $R_4$, are shown as they travel through the system. Rays $R_3$, $R_4$ enter instrument 20 through aperture 32, pass through the body of the instrument, and exit the instrument through aperture 48. One or both of openings 32, 48 may be an aperture stop configured to limit vignetting of MFOV images, as previously described, and, in some embodiments, additional lenses or other optical elements also may be provided and disposed along MFOV axis 24.

After exiting instrument 20, rays $R_3$, $R_4$ are redirected by mirror 60, pass through imaging optics such as optical elements 62 and 64, and then encounter beamsplitter 68, all in a manner analogous to the behavior of NFOV rays shown in FIG. 4 and described above. Also similarly, beamsplitter 68 splits rays $R_3$, $R_4$ into a primarily visible signal represented by rays $R_3'$, $R_4'$, and a primarily infrared signal represented by rays $R_3''$, $R_4''$. These respective signals pass into visible camera 18 and near IR camera 16, respectively, which may receive, process, and record the image data.

Configuration 3: Wide Field of View (WFOV)

Figure 6:
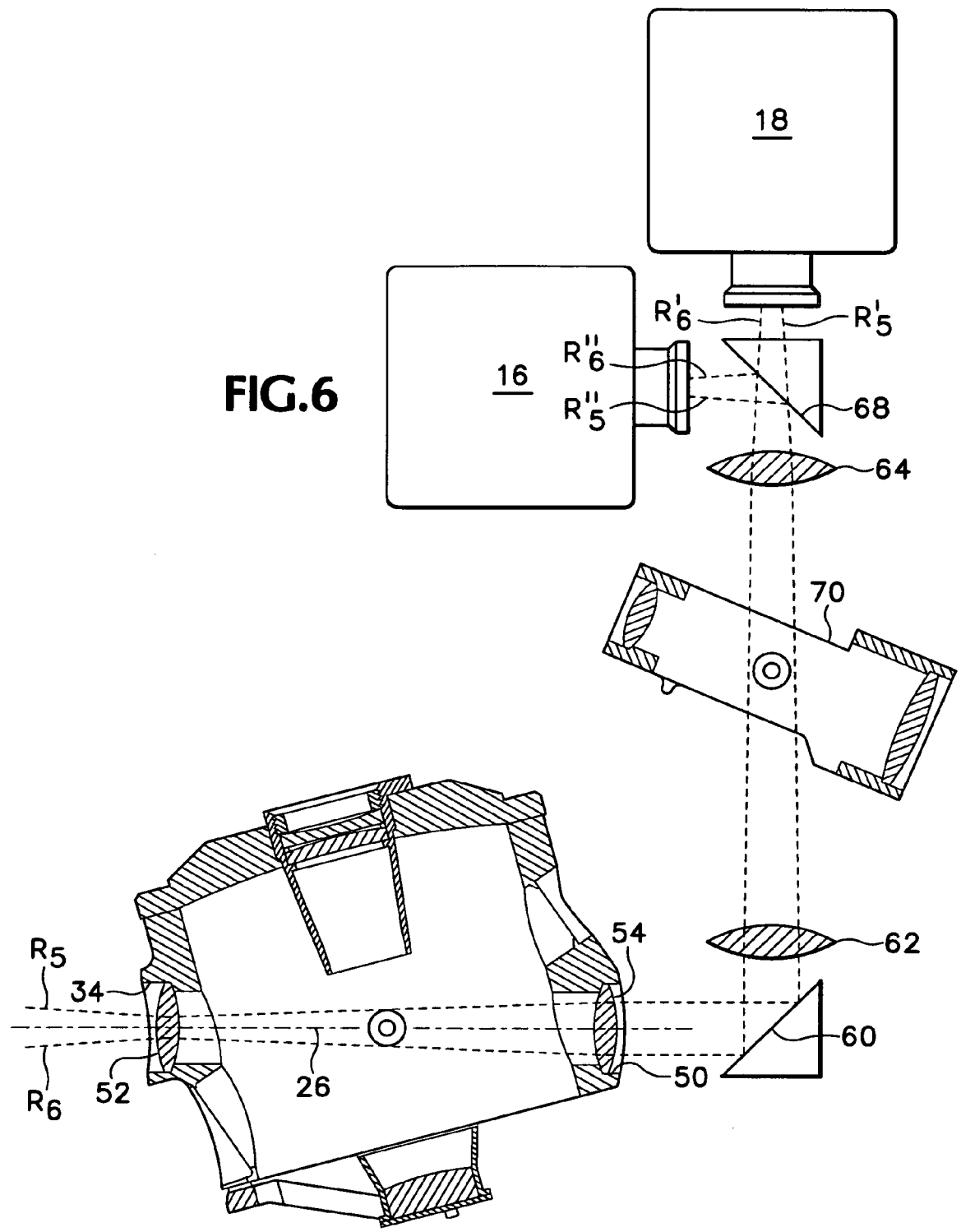
FIG. 6 is yet another partially schematic sectional view of the optical system of FIG. 1, showing the system configured to collect wide field of view (WFOV) image data.

FIG. 6 is yet another partially schematic sectional view of system 10, similar to FIGS. 4 and 5, but showing instrument 20 in position to receive wide field of view (WFOV) image data, in accordance with aspects of the present teachings. Here, WFOV optical axis 26 is aligned with the imaging axis of the system.

The paths of two representative parallel rays, $R_5$, $R_6$, are illustrated as they travel through the system. Rays $R_5$, $R_6$ enter instrument 20 through aperture 34, pass through WFOV lenses such as lenses 52, 54, continue through the body of the instrument, pass through lenses 56, 58, which may be configured to render the WFOV image data afocal, and exit the instrument through aperture 50.

After exiting instrument 20, parallel rays $R_5$, $R_6$ are redirected by mirror 60, pass through imaging optics such as optical elements 62 and 64, and then encounter beamsplitter 68, all in a manner analogous to the behavior of the NFOV and MFOV rays shown in FIGS. 4 and 5 and described above. Again similarly, beamsplitter 68 splits rays $R_5$, $R_6$ into a primarily visible signal represented by rays $R_5'$, $R_6'$, and a primarily infrared signal represented by rays $R_5''$, $R_6''$. These respective signals pass into visible camera 18 and infrared camera 16, respectively, which may receive, process, and record the image data.

Configuration 4: Super Narrow Field of View (SNFOV)

FIG. 7 is yet another partially schematic sectional view of system 10, similar to FIG. 4, but showing the system in position to receive super narrow field of view (SNFOV) image data, in accordance with aspects of the present teachings. Here, the position of instrument 20 is identical to its position when receiving NFOV image data, i.e., NFOV optical axis 22 is aligned with the imaging axis of the system. However, additional components are used to further increase the focal length and thus to further increase the field of view.

The paths of two representative parallel rays $R_7$, $R_8$ are illustrated as they travel through the system. Rays $R_7$, $R_8$ enter the instrument through aperture 30, reflect first from primary mirror 38, reflect second from secondary mirror 40, and then pass through lenses 44, 46 before exiting the instrument through aperture 36, all in a manner identical to the behavior of rays $R_1$, $R_2$ shown in FIG. 4.

After exiting instrument 20, rays $R_7$, $R_8$ are redirected by mirror 60, and pass through optical element 62. However, before encountering optical element 64, the rays pass into a SNFOV telescope 70. Telescope 70 is rotatable, and may be configured to provide any desired additional magnification of image data received by system 10, beyond that provided by the other optical components of the system. For example, in the depicted embodiment, telescope 70 is a refracting telescope configured to provide a magnification of 1.83×. The SNFOV telescope may rotate in a manner similar to the rotation mechanism of instrument 20, i.e., using one or more bearing surfaces such as cylindrical bearings, cones, or bearing races, among others. Rotation of telescope 70 may be motor-driven, or it may in some hand-held or otherwise portable embodiments be accomplished manually.

Telescope 70 depicted in FIG. 7 includes two lenses 72 and 74 through which the received image signal passes. The first of these lenses is configured to provide the desired magnification of the telescope, and the second of these lenses is configured to render the image passing out of telescope 70 afocal, for reasons already described above. Thus, rays $R_7$, $R_8$ are focused to the same degree when they exit telescope 70 as when they enter it, as FIG. 7 indicates. In some embodiments, there may be multiple lenses, or no lenses at all, disposed at the ends of telescope 70, to assist in processing the light passing through the telescope.

After exiting SNFOV telescope 70, rays $R_7$, $R_8$ pass through imaging optics such as optical element 64, and then encounter beamsplitter 68, all in a manner analogous to the behavior of the NFOV, MFOV, and WFOV rays shown in FIGS. 4-6 and described above. Also similarly, beamsplitter 68 splits rays $R_7$, $R_8$ into a primarily visible signal represented by rays $R_7'$, $R_8'$, and a primarily infrared signal represented by rays $R_7''$, $R_8''$. These respective signals pass into visible camera 18 and infrared camera 16, respectively, which may receive, process, and/or record the image data.

EXAMPLES

This section describes additional aspects and embodiments of the present teachings, presented without limitation as a series of numbered paragraphs.

1. An optical system, comprising (A) a first optical component having a first optical axis and providing a first field of view; (B) a second optical component having a second optical axis and providing a second field of view; (C) an imaging system having an imaging axis; and (D) a housing for mounting the first and second optical components, the housing configured to rotate about a rotation axis to a first position wherein the first optical axis is at least substantially coincident with the imaging axis, and to a second position wherein the second optical axis is at least substantially coincident with the imaging axis; wherein the rotation axis is at least substantially perpendicular to the imaging axis.

2. The optical system of paragraph 1, wherein the first optical axis, the second optical axis, and the imaging axis all lie at least substantially within a common plane, and wherein the rotation axis is at least substantially perpendicular to the common plane.

3. The optical system of paragraph 1 or 2, wherein the first optical component is a reflecting telescope providing a narrow field of view.

4. The optical system of paragraph 3, wherein the reflecting telescope is afocal.

5. The optical system of paragraph 4, wherein the reflecting telescope includes a primary mirror, a secondary mirror, and at least one lens for afocally producing an image.

6. The optical system of paragraph 5, wherein the reflecting telescope includes a first baffle attached to the secondary mirror and configured to limit light reaching the secondary mirror at least substantially to light reflected from the primary mirror, and a second baffle attached to the primary mirror and configured to limit light exiting the reflecting telescope at least substantially to light reflected from the secondary mirror.

7. The optical system of any of paragraphs 1-6, wherein the second optical component is a reverse refracting telescope providing a wide field of view.

8. The optical system of paragraph 7, wherein the refracting telescope is afocal and includes at least one converging lens and at least one diverging lens.

9. The optical system of paragraph 8, wherein the refracting telescope includes a first pair of lenses configured to minify incoming image data, and a second pair of lenses configured to render outgoing image data afocal.

10. The optical system of any of paragraphs 7-9, wherein the refracting telescope includes an aperture stop configured to limit vignetting of images.

11. The optical system of any of paragraphs 1-10, further comprising a third optical component for providing a third field of view, the third optical component having a third optical axis and configured to be mounted within the housing, the housing configured to rotate to a third position wherein the third optical axis is at least substantially coincident with the imaging axis.

12. The optical system of paragraph 11, wherein the first optical axis, the second optical axis, and the third optical axis intersect at least substantially at a point and define a common plane, wherein the imaging axis lies at least substantially within the common plane when the first, second, and third optical components are mounted within the housing, and wherein the rotation axis is at least substantially perpendicular to the common plane.

13. The optical system of paragraph 11 or 12, wherein the third optical component includes an aperture stop for reducing vignetting of medium field of view images.

14. The optical system of any of paragraphs 1-13, further comprising a dichroic beamsplitter.

15. The optical system of paragraph 14, wherein the beamsplitter is configured to split incoming image data into a first beam of at least substantially visible light, and a second beam of at least substantially infrared light (or, in some embodiments, near infrared light).

16. An optical system providing multiple fields of view, comprising (A) at least two telescopes, each providing a distinct field of view; (B) an imaging system for producing images from image data collected along an imaging axis by the telescopes; and (C) a rotatable turret to which the telescopes are mounted, the turret configured to discretely change the field of view of the image data collected by rotating around a rotation axis disposed at least substantially perpendicular to the imaging axis until an optical axis of exactly one of the telescopes is at least substantially aligned with the imaging axis.

17. The optical system of paragraph 16, wherein one of the telescopes is a reflecting telescope configured to magnify the image data collected, and wherein another of the telescopes is a refracting telescope configured to minify the image data collected.

18. The optical system of paragraph 17, wherein the reflecting telescope and the refracting telescope each are afocal.

19. The optical system of any of paragraphs 16-18, further comprising an optical component mounted to the turret and providing a medium field of view in which the image data collected is neither magnified nor minified.

20. The optical system of any of paragraphs 16-19, wherein the imaging system includes a beamsplitter configured to divide the image data collected into at least two beams, one of which contains at least substantially visible light, and another of which contains at least substantially infrared light (or, in some embodiments, near infrared light).

21. A method of obtaining an optical image, comprising (A) choosing a magnification for incoming image data from a set of at least three discrete magnifications; and (B) selectively aligning an optical axis of exactly one of a plurality of optical components with an imaging axis to obtain an image having the chosen magnification; wherein the step of aligning the optical axis includes rotating each of the optical components around a rotation axis disposed at least substantially perpendicular to the imaging axis.

22. The method of paragraph 21, wherein one of the optical components is a reflecting telescope configured afocally to produce a magnified image, and another of the optical components is a refracting telescope configured afocally to produce a minimized image.

23. The method of paragraph 22 or 23, wherein the reflecting telescope and the refracting telescope are rigidly connected to a common telescope housing, and wherein aligning the optical axis with the imaging axis includes rotating the housing around the rotation axis.

24. An optical instrument, comprising (A) a reflecting telescope configured to transform incoming image data received at the reflecting telescope into magnified afocal outgoing image data; (B) an inverse refracting telescope rigidly attached to the reflecting telescope, the refracting telescope configured to transform incoming image data received at the refracting telescope into minified afocal outgoing image data; (C) an aperture stop, such as a medium field aperture stop, rigidly attached to the reflecting telescope, the aperture stop configured to limit illumination falloff of image data passing through the aperture stop; and (D) a rotation mechanism for simultaneously rotating the reflecting telescope, the refracting telescope, and the aperture stop to selectively direct exactly one of the magnified afocal outgoing image data, the minified afocal outgoing image data, or the image data passing through the aperture stop at least substantially along an imaging axis.

25. The optical instrument of paragraph 24, further comprising an imaging system configured to produce at least one focused image from the image data directed along the imaging axis.

26. The optical instrument of paragraph 25, wherein the imaging system includes a dichroic beamsplitter configured to split the image data directed along the imaging axis into a first beam of at least substantially visible light and a second beam of at least substantially infrared light (or, in some embodiments, near infrared light), and wherein the imaging system is configured to produce a first focused image from the first beam, and a second focused image from the second beam.

27. The optical instrument of any of paragraphs 24-26, wherein the rotation mechanism is configured to rotate the reflecting telescope, the refracting telescope, and the aperture stop around a rotation axis disposed at least substantially perpendicular to the imaging axis.

The disclosure set forth above may encompass multiple distinct inventions with independent utility. The disclosure includes a number of section headings, which were added for convenience, and which are not intended to limit the disclosure in any way (e.g., the headings to not foreclose using information described in one section in place of, and/or in combination with, information described in other sections). Similarly, the disclosure relates information regarding specific embodiments, which are included for illustrative purposes, and which are not to be considered in a limiting sense, because numerous variations are possible. The inventive subject matter of the disclosure includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. An optical system, comprising:
   a reflecting telescope including first and second mirrors disposed in fixed, non-rotatable relation to each other, the reflecting telescope having a first optical axis and providing a first field of view;
   a refracting telescope having a second optical axis and providing a second field of view;
   an imaging system having an imaging axis; and
   a housing for mounting the reflecting telescope and the refracting telescope, the housing configured to rotate about a rotation axis to a first position wherein the first optical axis is at least substantially coincident with the imaging axis, and to a second position wherein the second optical axis is at least substantially coincident with the imaging axis;
   wherein the rotation axis is at least substantially perpendicular to the imaging axis.

2. The optical system of claim 1, wherein the first optical axis, the second optical axis, and the imaging axis all lie at least substantially within a common plane, and wherein the rotation axis is at least substantially perpendicular to the common plane.

3. The optical system of claim 1, wherein the reflecting telescope provides a narrow field of view.

4. The optical system of claim 1, wherein the refracting telescope provides a wide field of view.

5. The optical system of claim 1, wherein the reflecting telescope provides a narrow field of view, and wherein the refracting telescope provides a wide field of view.

6. The optical system of claim 1, further comprising an optical component for providing a medium field of view, the optical component having a third optical axis and configured to be mounted within the housing, the housing configured to rotate to a third position wherein the third optical axis is at least substantially coincident with the imaging axis.

7. The optical system of claim 6, wherein the first optical axis, the second optical axis, and the third optical axis intersect at least substantially at a point and define a common plane, wherein the imaging axis lies at least substantially within the common plane when the reflecting telescope, the refracting telescope, and the optical component are mounted within the housing, and wherein the rotation axis is at least substantially perpendicular to the common plane.

8. The optical system of claim 6, wherein the optical component includes an aperture stop for reducing vignetting of medium field of view images.

9. The optical system of claim 1, further comprising a dichroic beamsplitter configured to split incoming image data into a first beam of at least substantially visible light, and a second beam of at least substantially infrared light.

10. An optical system providing multiple fields of view, comprising:
    a reflecting telescope including first and second mirrors disposed in fixed, non-rotatable relation to each other and a refracting telescope, the reflecting telescope and the refracting telescope each providing a distinct field of view;
    an imaging system for producing images from image data collected along an imaging axis by the telescopes; and
    a rotatable turret to which the telescopes are mounted, the turret configured to discretely change the field of view of the image data collected by rotating around a rotation axis disposed at least substantially perpendicular to the imaging axis until an optical axis of exactly one of the telescopes is at least substantially aligned with the imaging axis.

11. The optical system of claim 10, wherein the reflecting telescope is configured to magnify the image data collected, and wherein the refracting telescope is configured to minify the image data collected.

12. The optical system of claim 10, further comprising an optical component mounted to the turret and providing a medium field of view in which the image data collected is neither magnified nor minified.

13. The optical system of claim 10, wherein the imaging system includes a beamsplitter configured to divide the image data collected into at least two beams, one of which contains at least substantially visible light, and another of which contains at least substantially infrared light.

14. A method of obtaining an optical image, comprising:
    choosing a magnification for incoming image data from a set of at least three discrete magnifications; and
    selectively aligning an optical axis of exactly one of a plurality of optical components with an imaging axis to obtain an image having the chosen magnification;
    wherein at least one of the optical components is a reflecting telescope including first and second mirrors disposed in fixed, non-rotatable relation to each other and at least another of the optical components is a refracting telescope; and
    wherein the step of aligning the optical axis includes rotating each of the optical components around a rotation axis disposed at least substantially perpendicular to the imaging axis.

15. The method of claim 14, wherein the reflecting telescope is configured afocally to produce a magnified image, and wherein the refracting telescope is configured afocally to produce a minimized image.

16. The method of claim 15, wherein the reflecting telescope and the refracting telescope are rigidly connected to a common telescope housing, and wherein aligning the optical axis with the imaging axis includes rotating the housing around the rotation axis.

17. An optical instrument, comprising:
    a reflecting telescope including first and second mirrors configured to transform incoming image data received at the reflecting telescope into magnified afocal outgoing image data;
    an inverse refracting telescope rigidly attached to the first and second mirrors of the reflecting telescope, the refracting telescope configured to transform incoming image data received at the refracting telescope into minified afocal outgoing image data;
    an aperture stop rigidly attached to the first and second mirrors of the reflecting telescope, the aperture stop configured to limit illumination falloff of image data passing through the aperture stop; and
    a rotation mechanism for simultaneously rotating the reflecting telescope, the refracting telescope, and the aperture stop to selectively direct exactly one of the magnified afocal outgoing image data, the minified afocal outgoing image data, or the image data passing through the aperture stop at least substantially along an imaging axis.

18. The optical instrument of claim 17, further comprising an imaging system configured to produce at least one focused image from the image data directed along the imaging axis.

19. The optical instrument of claim 17, wherein the rotation mechanism is configured to rotate the reflecting telescope, the refracting telescope, and the aperture stop around a rotation axis disposed at least substantially perpendicular to the imaging axis.

20. The optical instrument of claim 17, wherein the imaging system includes a dichroic beamsplitter configured to split the image data directed along the imaging axis into a first beam of at least substantially visible light and a second beam of at least substantially infrared light, and wherein the imaging system is configured to produce a first focused image from the first beam, and a second focused image from the second beam.

21. The optical system of claim 1, further comprising an optical component mounted outside the housing and providing a third field of view, the optical component configured selectively to provide magnification of image data received by the optical system and passing through at least one of the reflecting telescope and the refracting telescope.

22. An optical system, comprising:
  a first optical component including a first pair of optical elements disposed in fixed, non-rotatable relation to each other, the first optical component having a first optical axis and providing a first field of view;
  a second optical component including a second pair of optical elements disposed in fixed, non-rotatable relation to each other, the second optical component having a second optical axis and providing a second field of view;
  an imaging system having an imaging axis;
  a housing for mounting the first optical component and the second optical component, the housing configured to rotate about a rotation axis to a first position wherein the first optical axis is at least substantially coincident with the imaging axis, and to a second position wherein the second optical axis is at least substantially coincident with the imaging axis; and
  a third optical component including a third pair of optical elements disposed in fixed, non-rotatable relation to each other, the third optical component mounted outside the housing and providing a third field of view, the third optical component configured selectively to provide magnification of image data received by the optical system and passing through at least one of the first optical component and the second optical component;
  wherein the rotation axis is at least substantially perpendicular to the imaging axis.

* * * * *